United States Patent
Wang et al.

(10) Patent No.: US 10,680,992 B2
(45) Date of Patent: Jun. 9, 2020

(54) SYSTEMS AND METHODS TO MANAGE COMMUNICATIONS REGARDING A POST IN A SOCIAL NETWORK

(71) Applicant: Facebook, Inc., Menlo Park, CA (US)

(72) Inventors: Meihong Wang, Sunnyvale, CA (US); Ansha Yu, Sunnyvale, CA (US); Yan Wu, Fremont, CA (US); Wenyuan Yu, Fremont, CA (US); Yisong Song, Mountain View, CA (US)

(73) Assignee: Facebook, Inc., Menlo Park, CA (US)

( * ) Notice: Subject to any disclaimer, the term of this patent is extended or adjusted under 35 U.S.C. 154(b) by 317 days.

(21) Appl. No.: 14/977,285

(22) Filed: Dec. 21, 2015

(65) Prior Publication Data

US 2017/0177167 A1    Jun. 22, 2017

(51) Int. Cl.
*H04L 12/58* (2006.01)
*G06Q 50/00* (2012.01)

(52) U.S. Cl.
CPC .............. *H04L 51/32* (2013.01); *G06Q 50/01* (2013.01)

(58) Field of Classification Search
CPC .. G06F 3/0481; G06F 3/04847; G06F 3/0485; H04L 51/32; G06Q 50/01
See application file for complete search history.

(56) References Cited

U.S. PATENT DOCUMENTS

| | | | | |
|---|---|---|---|---|
| 9,590,942 B1* | 3/2017 | Yeskel | | H04L 51/32 |
| 2005/0182645 A1* | 8/2005 | Ehlis | | G06F 17/3089 |
| | | | | 705/51 |
| 2006/0061597 A1* | 3/2006 | Hui | | G06F 3/0481 |
| | | | | 345/629 |
| 2008/0147810 A1* | 6/2008 | Kumar | | G06Q 10/107 |
| | | | | 709/206 |
| 2011/0161987 A1* | 6/2011 | Huang | | G06Q 10/10 |
| | | | | 719/318 |
| 2011/0196935 A1* | 8/2011 | Rideout | | H04W 4/21 |
| | | | | 709/206 |
| 2012/0317476 A1* | 12/2012 | Goldman | | G06F 17/2235 |
| | | | | 715/243 |
| 2013/0332523 A1* | 12/2013 | Luu | | G06Q 30/0251 |
| | | | | 709/204 |
| 2015/0212673 A1* | 7/2015 | Geraghty | | G06F 3/0484 |
| | | | | 715/730 |
| 2016/0308816 A1* | 10/2016 | Harpur | | G06Q 50/01 |

* cited by examiner

*Primary Examiner* — Mandrita Brahmachari
(74) *Attorney, Agent, or Firm* — Sheppard Mullin Richter Hampton LLP

(57) ABSTRACT

Systems, methods, and non-transitory computer readable media are configured to subscribe a subscriber to a content item appearing at a first position in a news feed of content items based on selection of a setting to subscribe to the content item. A pop up window including a response associated with the content item on a user interface displayed by a computing device associated with the subscriber is presented to the subscriber based on posting of the response. Scrolling of the news feed in response to user inputs is concurrently presented on the user interface while the pop up window is presented. At least one selectable setting to dismiss the pop up window from view on the user interface is provided. In response to dismissal, the content item assumes the first position in the news feed or assumes a second position in the news feed based on a re-ranking.

20 Claims, 7 Drawing Sheets

SYSTEMS AND METHODS TO MANAGE COMMUNICATIONS REGARDING A POST IN A SOCIAL NETWORK

FIELD OF THE INVENTION

The present technology relates to the field of content provision. More particularly, the present technology relates to techniques for managing communications regarding a post in a social networking system.

BACKGROUND

Today, people often utilize computing devices for a wide variety of purposes. Users can use their computing devices, for example, to communicate and otherwise interact with other users. Such interactions are increasingly popular over a social networking system.

Some interactions in a social network may include the sharing of content. Content can be shared in a variety of manners. One example of a technique to share content with a user in a social network is a news feed. The news feed can be a sequential listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc. A user presented with a content item in a news feed can interact with the content item in a variety of manners, including responding to the content item.

SUMMARY

Various embodiments of the present technology can include systems, methods, and non-transitory computer readable media configured to subscribe a subscriber to a content item appearing at a first position in a news feed of content items based on selection of a setting to subscribe to the content item. A pop up window including a response associated with the content item is presented on a user interface displayed by a computing device associated with the subscriber to the subscriber based on posting of the response. Scrolling of the news feed in response to user inputs is concurrently presented on the user interface while the pop up window is presented At least one selectable setting to dismiss the pop up window from view on the user interface is provided. In response to dismissal of the pop window, the content item assumes the first position in the news feed or assumes a second position in the news feed based on a re-ranking.

In an embodiment, the subscriber is at least one of a generator of the content item, a user referenced in the content item or the response, and a user interested in dialogue associated with the content item.

In an embodiment, a setting from the subscriber to subscribe to the content item is received.

In an embodiment, a default setting to subscribe the subscriber to the content item is maintained.

In an embodiment, the presenting to the subscriber a pop up window comprises providing to the subscriber a pop up window even if the subscriber has navigated away from a location of a social networking system where the content item is maintained.

In an embodiment, a second pop window presenting a second response and the response to the content item is provided to the subscriber based on posting of the second response.

In an embodiment, a text box in the pop up window is provided to allow the subscriber to prepare a second response associated with the content item.

In an embodiment, a selection of a setting to temporarily dismiss the pop up window is received. The pop up window is removed from view until a next response associated with the content item is posted.

In an embodiment, a selection of a setting to permanently dismiss the pop up window is received. The pop up window is prevented from reappearing if a next response associated with the content item is posted.

In an embodiment, it is determined whether a number of pop up windows associated with a plurality of content items satisfies a threshold value. Presentation of dialogues associated with the plurality of content items is compressed into an aggregated window for presentation to the subscriber based on satisfaction of the threshold value.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

Figure 1:
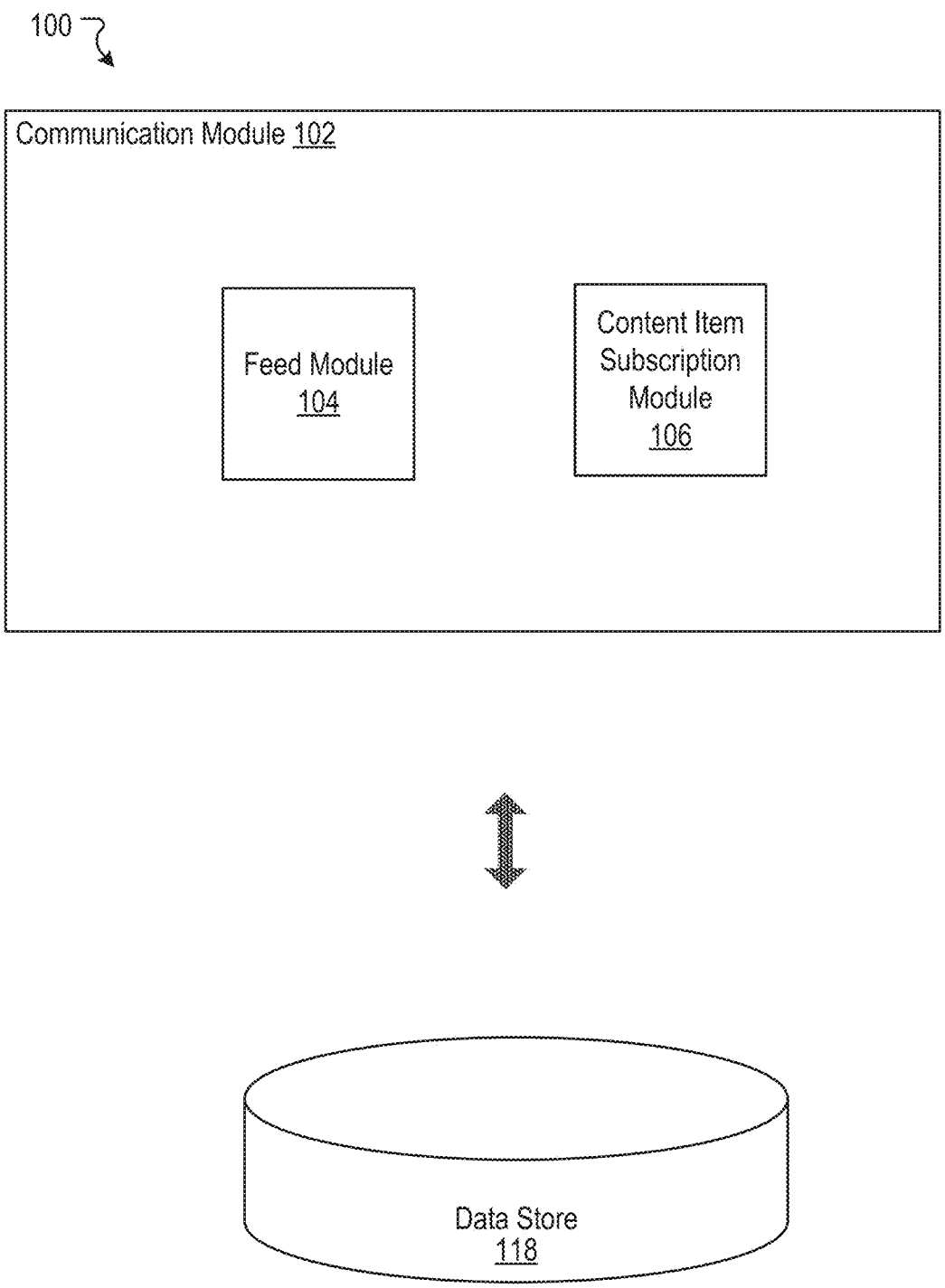
FIG. 1 illustrates a system including an example communication module, according to an embodiment of the present technology.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Managing a Subscription to a Content Item

As mentioned, an example of a technique to share content with a user in a social networking system is a news feed. The news feed can be an ordered listing of content items (or stories) that are deemed appropriate for presentation to the user. The news feed for the user can include myriad types of content items. Such content items can include, for example, images uploaded by others in the social network of the user, descriptions of activities of connections of the user, articles regarding subject matter of interest to the user, advertisements directed to the user, etc.

The social networking system can allow interactions with the content items. For example, a first user presented with a content item in a news feed can interact with the content item by responding to the content item. In this example, a second user can respond to the content item or to the response provided by the first user. Further, additional users can respond to the content or an earlier response. In this manner, a social networking system can support a productive dialogue about a content item and responses thereto.

However, access to and management of such dialogue can be difficult under conventional technologies. An original generator of a content item can post the content item so that the content item becomes eligible for presentation in news feeds of other users. When a user accesses the content item in a news feed and responds to the content item, the generator of the content item is typically notified about the response indirectly through a notification mechanism. If the generator would like to view or respond to the response of the user, the generator typically must first find the content item among the locations or pages where the generator has published content items with the social networking system. The task of finding the content item can be laborious and time consuming, especially when the generator is a prolific publisher on the social networking system. Moreover, after the generator ultimately responds as intended, the user must perform the same burdensome effort to locate that response before the user, in turn, can respond further.

An improved approach rooted in computer technology to manage information relating to a dialogue associated with a content item on a social networking system overcomes these and other disadvantages associated with conventional approaches implemented in computer technology. Systems, methods, and computer readable media of the present technology can provide a communications utility, such as a pop up window, in relation to subscription to a content item and associated dialogue about the content item. When subscribed to a content item, a generator of the content item can be immediately notified about a response to the content item provided by a user via a pop up window presented in a user interface of a client computing device associated with the generator. The pop up window can allow the generator to view and respond to the response provided by the user without cumbersome navigation to a location on the social networking system (e.g., a permalink) where the content item has been posted. Likewise, the user who responded to the content item can be subscribed to the content item so that a pop up window can notify the user when the generator or another user responds to the response provided by the user and allow the user to further respond. In some instances, a user who is referenced in the content item or any responses relating to the content item also can be subscribed to the content item. In other instances, a user with an interest in dialogue associated with the content item can be subscribed to the content item. After a pop up window appears for a subscriber subscribed to the content item, the subscriber can dismiss the appearance of the pop up window until the next response associated with the content item is posted or can dismiss the appearance of the pop up window permanently. When a threshold number of pop up windows relating to a plurality of content items is triggered, dialogue associated with the plurality of content items can be compressed into an aggregated window to optimize space in the user interface. More details regarding the present technology are discussed herein.

FIG. 1 illustrates an example system 100 including an example communication module 102 configured to provide a communications utility to allow subscription to a content item published in a news feed supported by a social networking system, according to an embodiment of the present technology. Subscription to the content item can allow a user to monitor and respond to dialogue associated with the content item. The communications utility can be implemented to provide real time (or near real time) notifications about a response to a content item and to allow a user to respond to the content item or a response to the content item without the need to navigate to a location on a page of the social networking system where the content item permanently resides (e.g., a permalink). In some embodiments, the communications utility can be implemented as a pop up window that can appear on a user interface of a client computing device associated with a user of the social networking system who is subscribed to a content item.

The communication module 102 can include a feed module 104 and a content item subscription module 106. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the communication module 102 can be implemented in any suitable combinations.

The feed module 104 can select content items (or stories) for presentation to a user in a social networking system. In one embodiment, the feed module 104 can train (and retrain) machine learning models for ranking content items for potential presentation in news feeds of users. For example, the feed module 104 can divide its users into different sets based on various attributes of the users (e.g., age, ethnicity, income, language, etc.) and can generate one or more models for each set of users. Users with different attributes may have different behavioral patterns that can reflect their interests in different topics reflected by content items. As a result, different models for ranking content items for different sets of users can provide more accurate ranking of content items and provide higher likelihood that users will be interested in the topics reflected by the content items presented to them.

Features used to train the models can include interactions of users with content items of a news feed. Such interactions can include, for example, selecting a link in the content item, commenting on the content item, liking the content item, and hiding the content item. The feed module 104 can use the models for each set of users to determine levels of interest of a user in topics reflected by content items. The level of interest of a user in each topic can be indicated by a topic score. The social networking system can rank a content item for potential presentation to a user based on a topic(s) reflected by the content item and the topic score(s) of the user for the topic(s). Content items having a ranking that satisfies a selected threshold value can be presented to the user in her news feed at a position corresponding to the ranking.

The content item subscription module 106 can allow subscription to a content item in a news feed to monitor and participate in dialogue relating to the content item. A generator of the content item or another user can subscribe to the content item. When a generator or other user is subscribed, the subscriber can be presented with a communications utility, such as a pop up window. The pop up window can allow the subscriber to manage dialogue associated with the content item. In particular, the pop up window can in real time (or near real time) notify the subscriber about the content of any responses associated with the content and allow the subscriber to post another response. The pop up window can appear even if the subscriber has navigated away from a page or other location where the content item is maintained. This functionality provided by the pop up window can obviate the need for the subscriber to view a notifications icon or other tool before the subscriber is aware of a response to a content item. The functionality provided by the pop up window also can obviate the need for the subscriber to navigate to the location of the content item on the social networking system before a response can be prepared. The pop up window can be selectively dismissed by the subscriber. The content item subscription module 106 is discussed in more detail herein.

In some embodiments, the communication module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the communication module 102 can be, in part or in whole, implemented as software running on one or more computing devices or systems, such as on a server or a client computing device. For example, the communication module 102 can be, in part or in whole, implemented within or configured to operate in conjunction or be integrated with a social networking system (or service), such as a social networking system 630 of FIG. 6. As another example, the communication module 102 can be implemented as or within a dedicated application (e.g., app), a program, or an applet running on a user computing device or client computing system. In some instances, the communication module 102 can be, in part or in whole, implemented within or configured to operate in conjunction or be integrated with client computing device, such as a user device 610 of FIG. 6. It should be understood that many variations are possible.

The data store 118 can be configured to store and maintain various types of data, such as the data relating to support of and operation of the communication module 102. The data can include data relating to, for example, content items, the identity of subscribers to content items, responses posted for content items, settings relating to subscriptions to content items, settings relating to dismissal of pop up windows, etc. The data store 118 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the communication module 102 can be configured to communicate and/or operate with the data store 118.

Figure 2:
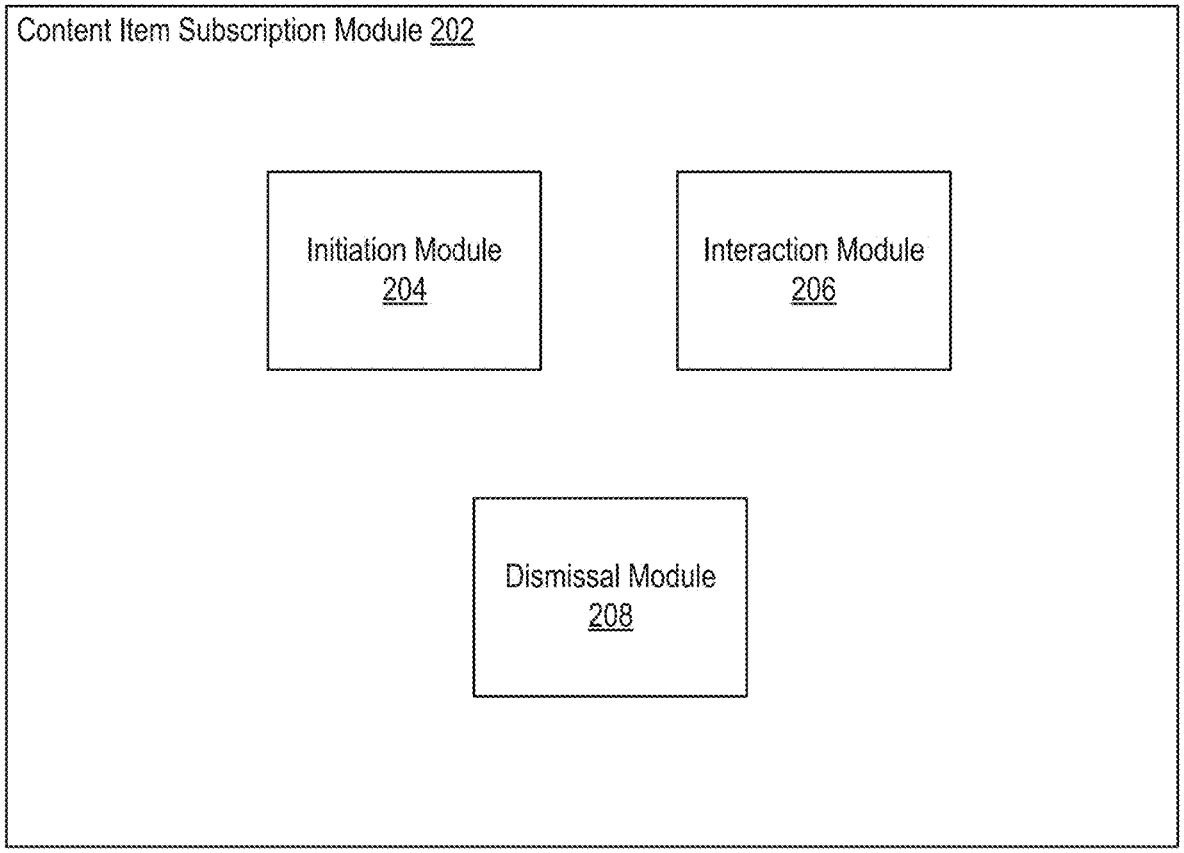
FIG. 2 illustrates an example content item subscription module, according to an embodiment of the present technology.

FIG. 2 illustrates an example content item subscription module 202, according to an embodiment of the present technology. In some embodiments, the content item subscription module 106 of FIG. 1 can be implemented with the content item subscription module 202. The content item subscription module 202 can allow subscription to a content item in a news feed to monitor and participate in dialogue relating to the content item. When a generator or other user is subscribed, a communications utility, such as a pop up window, can allow the subscriber to manage dialogue associated with the content item. As shown in the example of FIG. 2, the content item subscription module 202 can include an initiation module 204, an interaction module 206, and a dismissal module 208.

The initiation module 204 can initiate subscription to a content item based on settings provided by the social networking system, subscriber, or both. In some embodiments, the initiation module 204 can automatically subscribe a generator of a content item created by the generator to all dialogue associated with the content item as a default setting. In some embodiments, the initiation module 204 can subscribe a generator of a content item created by the generator to the content item based on selection by the generator of a setting to subscribe to the content item. The setting can be presented in a user interface of a client computing device associated with the generator to the generator before, during, or after creation of the content item. In some embodiments, the selection of a setting to subscribe to the content item can include selection of a subscribe button in relation to the content item, selection of a like button in relation to the content item, a posting of a comment in relation to the content item, and an action to share the content item with others.

In some embodiments, a user who is referenced in the content item or a response to the content item can be subscribed to the content item. In one instance, when a user is detected to be referenced in a content item or a response to the content item, the initiation module 204 can provide a notification to the user. The notification can present a selectable setting in a user interface of a client computing device associated with the user to invite the user to subscribe to the content item. If the user selects the setting, the user can be subscribed to the content item. In another instance, the initiation module 204 can automatically subscribe the user to the content item.

In some embodiments, a user who views a content item and wishes to subscribe to all dialogue associated with the content item can be presented with a selectable setting in a user interface of a client computing device associated with the user to subscribe to the content item. In one example, when the user views the content item, the user can be presented with a setting that when selected subscribes the user to the content item.

The interaction module 206 can present a communications utility, such as a pop up window, to present dialogue associated with a content item to which a subscriber is subscribed. In response to a determination by the initiation module 204 of the subscribers to a content item, the interaction module 206 can in real time (or near real time) present the pop up window to each subscriber when a response associated with the content item is posted. The pop up window can be presented to the subscriber even if the subscriber is not viewing a page where the content item resides on the social networking system. For example, a generator of a content item can subscribe to the content item at the time of posting of the content item. In this example, if the generator navigates away from the content item but remains on the page or navigates away from the page entirely, the pop up window can be presented to the generator when a response to the content item is posted.

Likewise, as another example, a user can view a content item in the news feed of the user presented on a page of the social networking system and subscribe to the content item. In this example, if the user navigates away from the content item but remains on the page or navigates away from the page entirely, the pop up window can be presented to the user when a response to the content item is posted. In some embodiments, the news feed and interactions with the news feed, such as scrolling of the news feed in response to user inputs, can be concurrently presented on the user interface while the pop up window is presented on the user interface.

The pop up window can be designed in a variety of manners. In some embodiments, the pop up window can include an identification of the generator of a subscribed content item and content (e.g., text, images, video, audio) of the content item. The pop up window can also include a listing of responses to the content item or responses to such responses. Each listed response can provide the identity of the author of the response and include the content of the response. The listing of responses can be a time ordered listing of responses. The pop up window can also include a text box in which the subscriber can write a comment as a response to the content item or to a previously posted response.

The pop window can include selectable settings to dismiss the pop up window. In some embodiments, the pop up window can include a selectable setting to temporarily dismiss the appearance of the pop up window. When this setting is selected by a subscriber, the pop up window can disappear from view until a subsequent response is posted for the content item. In some embodiments, the pop up window can include a selectable setting to permanently dismiss the appearance of the pop up window. When this setting is selected by a subscriber, the pop up window can disappear from view so that, even if a subsequent response is posted for the content item, the pop up window for the content item does not later appear.

In some embodiments, the interaction module 206 can present dialogues associated with a plurality of content items in an aggregated window. A subscriber can be subscribed to a plurality of content items. The interaction module 206 can determine if a number of pop up windows for a plurality of content items is to appear because responses associated with the content items have been posted. If the number of pop windows satisfies a threshold value, the interaction module 206 can compress a presentation of the dialogues for the content items into an aggregated window for presentation to the subscriber. Implementation of an aggregated window in this manner for a plurality of dialogues associated with the content items can avoid clutter associated with an undue number of pop windows and optimize space on a user interface through which the dialogues are presented.

The dismissal module 208 can apply settings selected by subscribers to dismiss content items. In some embodiments, when a subscriber selects a setting to dismiss a content item temporarily, the dismissal module 208 can cause a pop window associated with the content item to disappear from view until a next response is posted. In some embodiments, when a subscriber selects a setting to dismiss a content item permanently, the dismissal module 208 can cause a pop up window associated with the content item to disappear and not reappear even if a next response associated with the content item is posted. In some embodiments, after temporary or permanent dismissal of the pop up window, the content item associated with the pop up window can assume its original position in the news feed. In other embodiments, after dismissal of the pop up window, the content item can assume a new position in the news feed based on re-ranking of the content item in relation to other content items.

Figure 3:
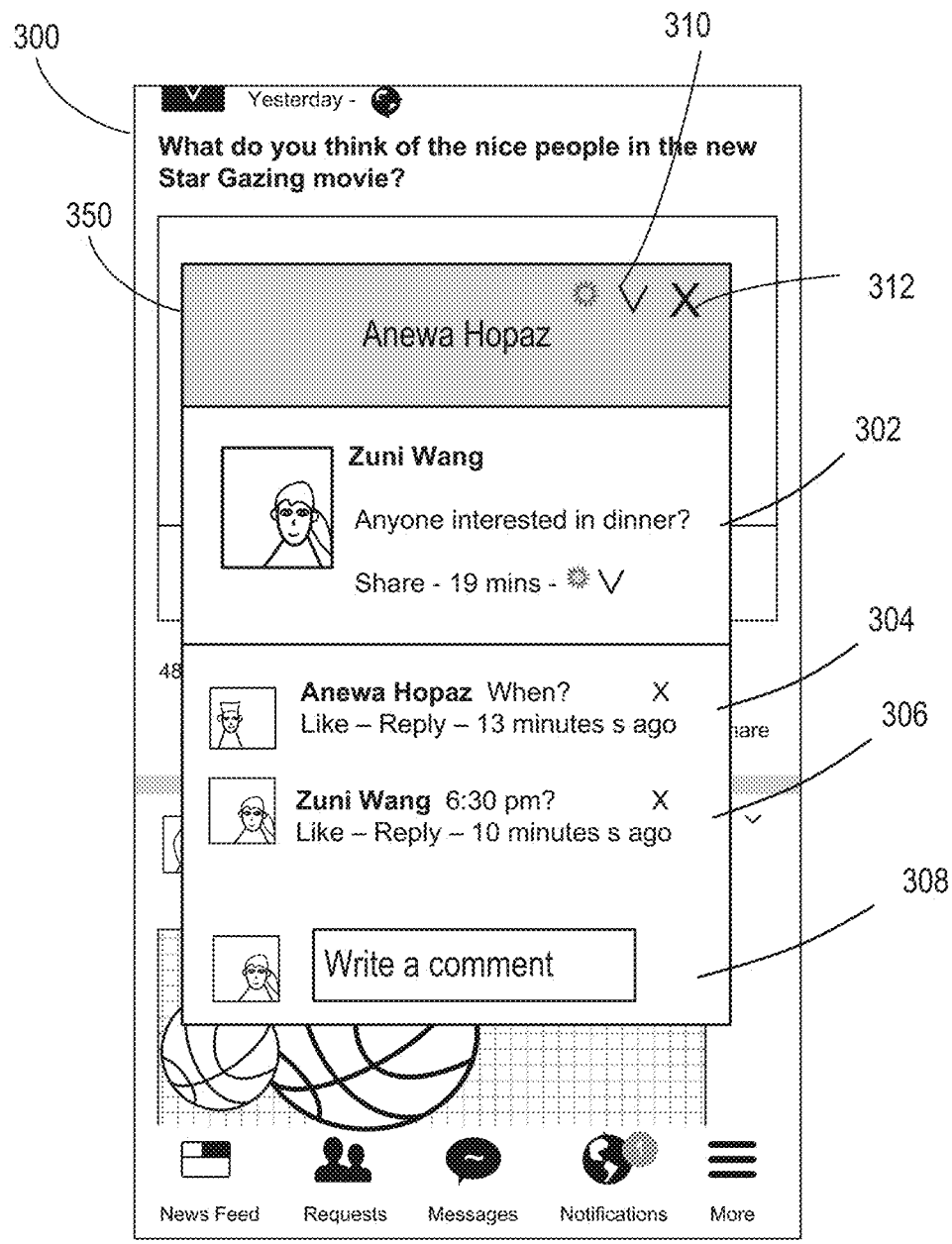
FIG. 3 illustrates an example user interface for managing a subscription to a content item, according to an embodiment of the present technology.

FIG. 3 illustrates an example user interface 300 presented on a screen of a computing device associated with a subscriber of a content item 302, according to an embodiment of the present technology. The subscriber can be any user who desires to monitor dialogue associated with the content item 302. In this example, the subscriber is a user who viewed the content item 302 when it was presented in a news feed of the subscriber. The content item 302 was originally posted by a generator of the content item 302. In this example, a pop up window 350 is presented to the subscriber. The pop window 350 is presented to the subscriber even though the subscriber has navigated away from a view of the news feed where the content item 302 first appeared and another location of a page of the social networking system where the content item 302 is otherwise maintained.

The pop up window 350 includes the content item 302. The content item 302 includes an identification of the generator and content. The pop up window 350 also includes a listing of responses to the content item 302. A response 304 provided by the subscriber in response to the content item is presented in the pop up window 350. A response 306 provided by the generator in response to the response 304 is also presented in the pop up window 350. The responses 304, 306 are ordered in the list based on the time of their posting. A text box 308 allows the subscriber to write a response to one or more of the responses 304, 306. If the subscriber posts a response using the text box 308, other subscribers to the content item 302 will be presented with pop up windows including the response. The pop up window 350 includes a reference 310 to allow the subscriber to select a setting to temporarily dismiss the pop up window 350 until a next response associated with the content item is posted. The pop up window 350 also includes a reference 312 to allow the subscriber to select a setting to permanently dismiss the pop up window 350.

Figure 4:
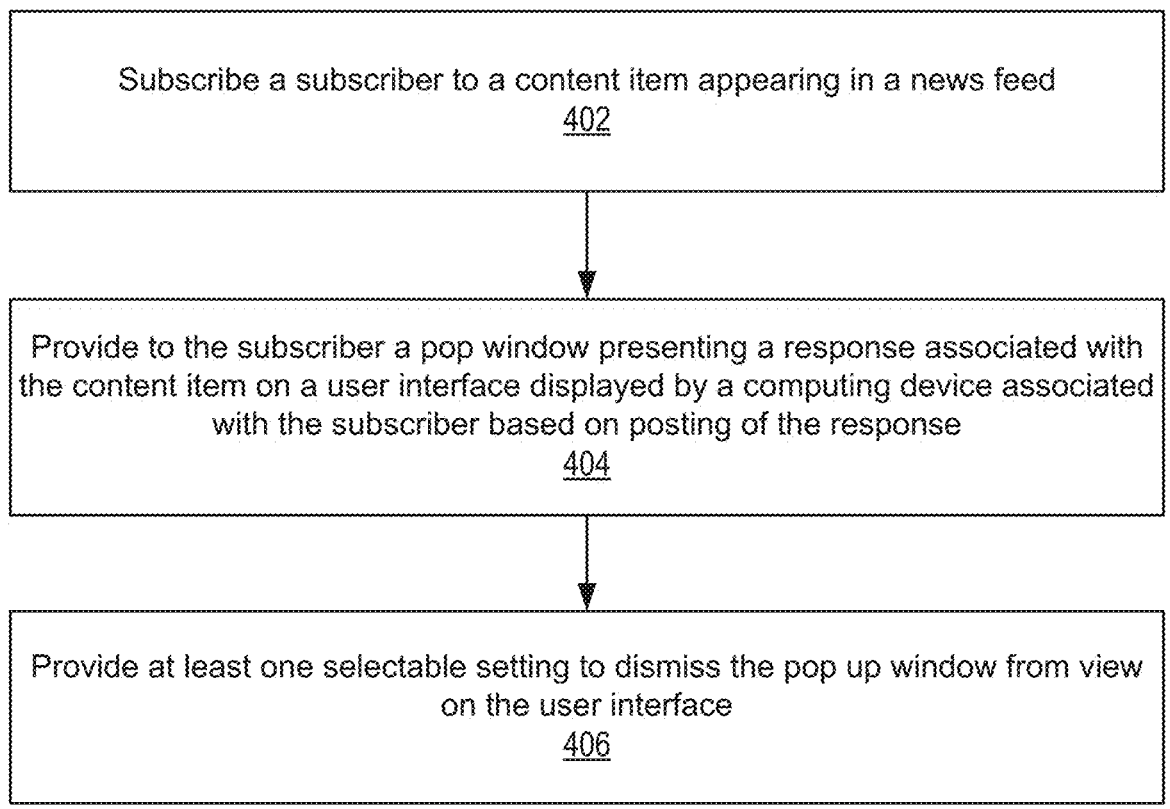
FIG. 4 illustrates a first method to manage a subscription to a content item, according to an embodiment of the present technology.

FIG. 4 illustrates an example method 400 to subscribe to a content item, according to an embodiment of the present technology. It should be appreciated that there can be additional, fewer, or alternative steps performed in similar or alternative orders, or in parallel, in accordance with the various embodiments and features discussed herein unless otherwise stated.

At block 402, the method 400 can subscribe a subscriber to a content item appearing in a news feed. At block 404, the method 400 can provide to the subscriber a pop window presenting a response associated with the content item on a user interface displayed by a computing device associated with the subscriber based on posting of the response. At block 406, the method 400 can provide at least one selectable setting to dismiss the pop up window from view on the user interface. Other suitable techniques that incorporate various features and embodiments of the present technology are possible.

Figure 5:
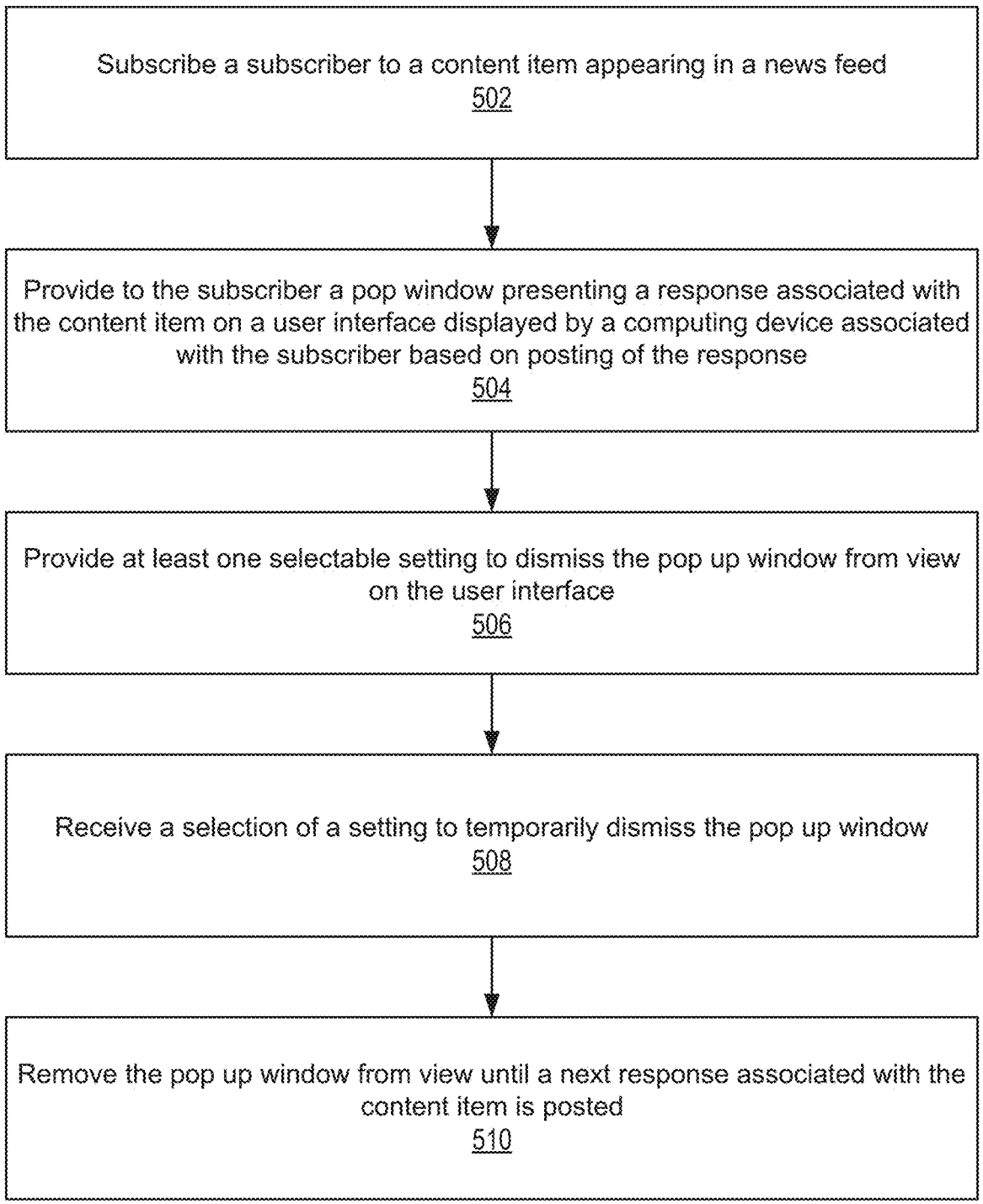
FIG. 5 illustrates a second method to manage a subscription to a content item, according to an embodiment of the present technology.

FIG. 5 illustrates an example method 500 to subscribe to a content item, according to an embodiment of the present technology. It should be appreciated that there can be additional, fewer, or alternative steps performed in similar or alternative orders, or in parallel, in accordance with the various embodiments and features discussed herein unless otherwise stated.

At block 502, the method 500 can subscribe a subscriber to a content item appearing in a news feed. At block 504, the method 500 can provide to the subscriber a pop window presenting a response associated with the content item on a user interface displayed by a computing device associated with the subscriber based on posting of the response. At block 506, the method 500 can provide at least one selectable setting to dismiss the pop up window from view on the user interface. At block 508, the method 500 can receive a selection of a setting to temporarily dismiss the pop up window. At block 510, the method 500 can remove the pop up window from view until a next response associated with the content item is posted. Other suitable techniques that incorporate various features and embodiments of the present technology are possible.

Social Networking System—Example Implementation

Figure 6:
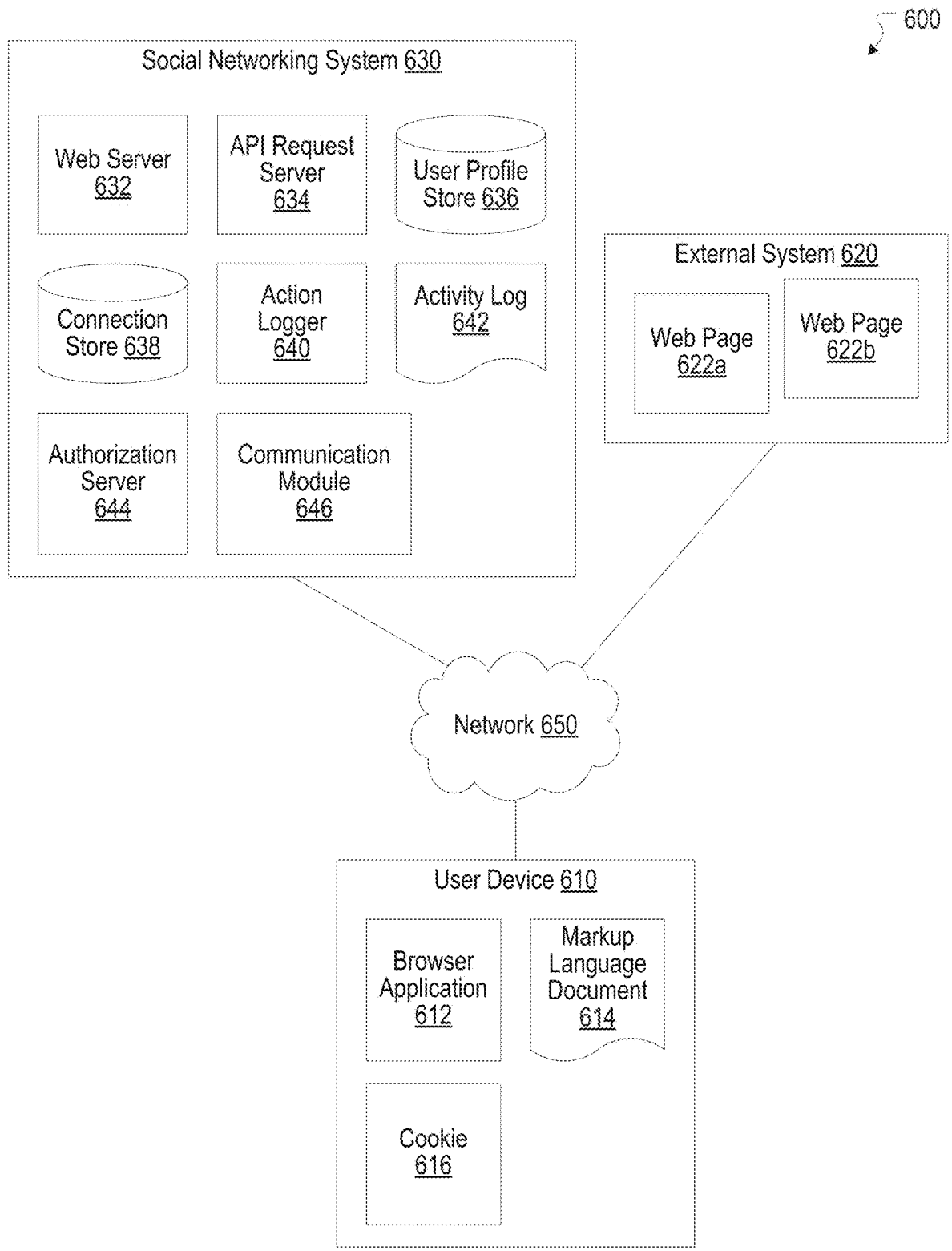
FIG. 6 illustrates a network diagram of an example system that can be utilized in various scenarios, according to an embodiment of the present technology.

FIG. 6 illustrates a network diagram of an example system 600 that can be utilized in various scenarios, in accordance with an embodiment of the present technology. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include a communication module 646. The communication module 646 can be implemented with the communication module 102, as discussed in more detail herein. In some embodiments, one or more functionalities of the communication module 646 can be implemented in the user device 610.

Hardware Implementation

Figure 7:
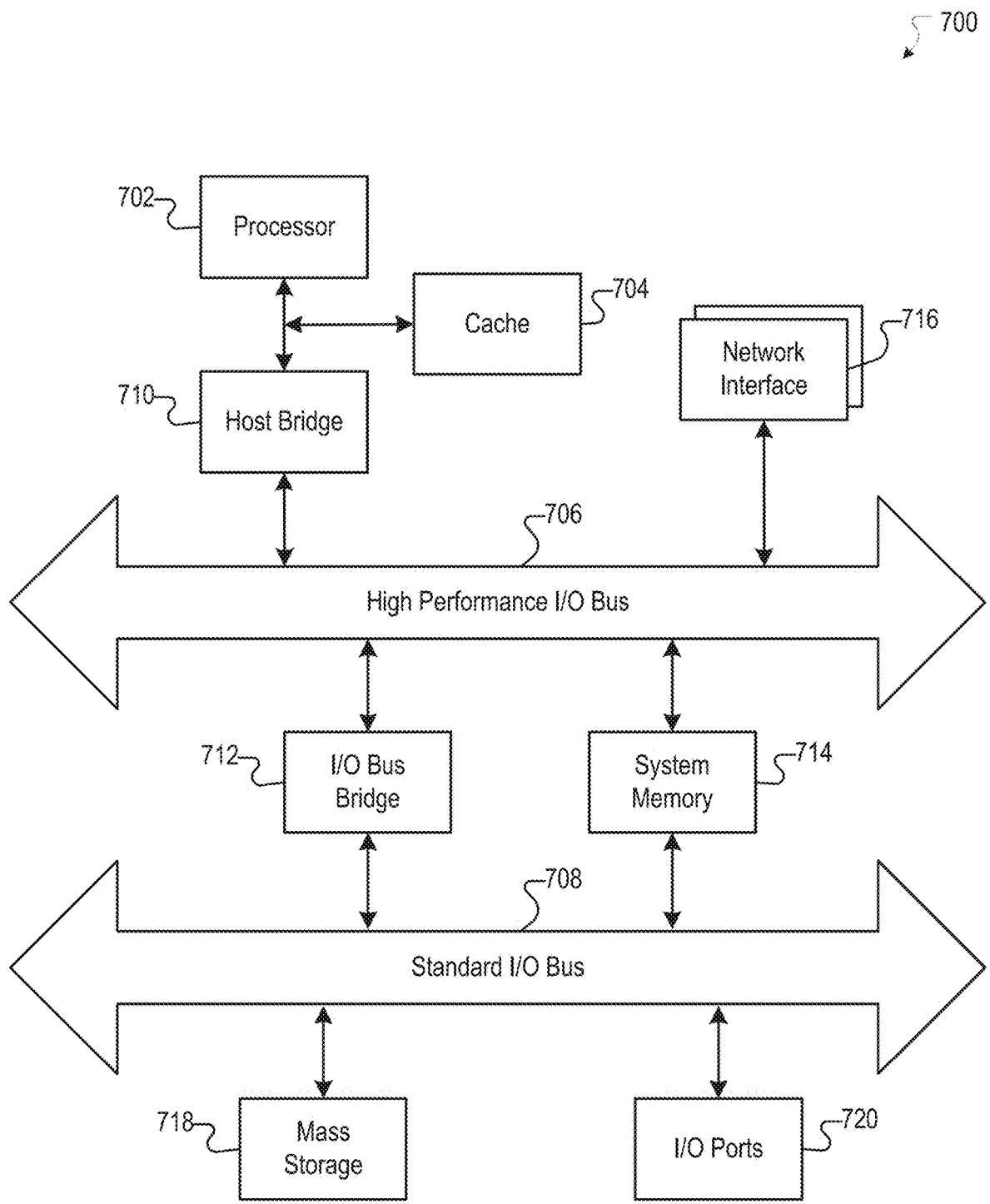
FIG. 7 illustrates an example of a computer system that can be utilized in various scenarios, according to an embodiment of the present technology.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
subscribing, by a computing system, a subscriber to a first content item appearing at a first position in a news feed of content items based on a selection of a first setting to subscribe to the first content item, wherein the subscriber is at least an original generator of the content item;
presenting, by the computing system, a first pop up window on a user interface associated with the subscriber, based on a posting of a first response associated with the first content item, wherein the first pop up window includes a first time ordered listing of responses associated with the first content item and the first response; and wherein a scrolling of the news feed in response to user inputs is concurrently presented on the user interface while the first pop up window is presented;
subscribing, by the computing system, the subscriber to a second content item appearing in the news feed based on a selection of a second setting to subscribe to the second content item;
presenting, by the computing system, a second pop up window on the user interface associated with the subscriber, wherein the second pop up window includes a second time ordered listing of responses associated with the second content item;
presenting, by the computing system, an aggregated pop up window that replaces the first pop up window and the second pop up window on the user interface associated with the subscriber based at least in part on a number of pop up windows satisfying a threshold value, wherein the aggregated window includes the first time ordered listing of responses and the second time ordered listing of responses; and
providing, by the computing system, at least one selectable setting to dismiss the aggregated pop up window from view on the user interface, wherein in response to dismissal of the aggregated pop window the first content item assumes the first position in the news feed or assumes a second position in the news feed based on a re-ranking, wherein the re-ranking is based at least in part on at least one of: the selection of the first setting to subscribe, the posting of the first response, or an interaction with the first time ordered listing of responses.

2. The computer-implemented method of claim 1, wherein the subscriber is at least one of: a user referenced in the first content item, a user referenced in the first response, or a user interested in dialogue associated with the first content item.

3. The computer-implemented method of claim 1, further comprising:
receiving the first setting from the subscriber to subscribe to the first content item.

4. The computer-implemented method of claim 1, further comprising:
maintaining a default setting to subscribe the subscriber to the first content item.

5. The computer-implemented method of claim 1, wherein the presenting the first pop up window comprises presenting the first pop up window after the subscriber has navigated away from a location of a social networking system where the first content item is maintained.

6. The computer-implemented method of claim 1, further comprising:
presenting the second pop window based at least in part on a posting of a second response.

7. The computer-implemented method of claim 1, further comprising:
providing a text box in the first pop up window to allow the subscriber to prepare a second response associated with the first content item.

8. The computer-implemented method of claim 1, further comprising:
receiving a selection of a setting to temporarily dismiss the first pop up window; and
removing the first pop up window from view until a next response associated with the first content item is posted.

9. The computer-implemented method of claim 1, further comprising:
receiving a selection of a setting to permanently dismiss the first pop up window;
preventing the first pop up window from reappearing after a next response associated with the first content item is posted.

10. The computer-implemented method of claim 1, further comprising:
determining the number of pop up windows in response to a new response associated with the first content item or the second content item being posted.

11. A system comprising:
at least one processor; and
a memory storing instructions that, when executed by the at least one processor, cause the system to perform:
subscribing a subscriber to a first content item appearing at a first position in a news feed of content items based on a selection of a first setting to subscribe to the first content item, wherein the subscriber is at least an original generator of the content item;
presenting a first pop up window on a user interface associated with the subscriber, based on a posting of a first response associated with the first content item, wherein the first pop up window includes a first time ordered listing of responses associated with the first content item and the first response and wherein a scrolling of the news feed in response to user inputs is concurrently presented on the user interface while the first pop up window is presented;
subscribing the subscriber to a second content item appearing in the news feed based on a selection of a second setting to subscribe to the second content item;
presenting a second pop up window on the user interface associated with the subscriber, wherein the second pop up window includes a second time ordered listing of responses associated with the second content item;
presenting an aggregated pop up window that replaces the first pop up window and the second pop up window on the user interface associated with the subscriber based at least in part on a number of pop up windows satisfying a threshold value, wherein the aggregated window includes the first time ordered listing of responses and the second time ordered listing of responses; and
providing at least one selectable setting to dismiss the aggregated pop up window from view on the user interface, wherein in response to dismissal of the aggregated pop window the first content item assumes the first position in the news feed or assumes a second position in the news feed based on a re-ranking, wherein the re-ranking is based at least in part on at least one of: the selection of the first setting to subscribe, the posting of the first response, or an interaction with the first time ordered listing of responses.

12. The system of claim 11, wherein the subscriber is at least one of: a user referenced in the first content item, a user referenced in the response, or a user interested in dialogue associated with the content item.

13. The system of claim 11, further comprising:
receiving the first setting from the subscriber to subscribe to the first content item.

14. The system of claim 11, further comprising:
maintaining a default setting to subscribe the subscriber to the first content item.

15. The system of claim 11, wherein the presenting the first pop up window comprises presenting the first pop up window after the subscriber has navigated away from a location of a social networking system where the first content item is maintained.

16. A non-transitory computer-readable storage medium including instructions that, when executed by at least one processor of a computing system, cause the computing system to perform a method comprising:
subscribing a subscriber to a first content item appearing at a first position in a news feed of content items based on a selection of a first setting to subscribe to the first content item, wherein the subscriber is at least an original generator of the content item;
presenting a first pop up window on a user interface associated with the subscriber, based on a posting of a first response associated with the first content item, wherein the first pop up window includes a first time ordered listing of responses associated with the first content item and the first response and wherein a scrolling of the news feed in response to user inputs is concurrently presented on the user interface while the first pop up window is presented;
subscribing the subscriber to a second content item appearing in the news feed based on a selection of a second setting to subscribe to the second content item;
presenting a second pop up window on the user interface associated with the subscriber, wherein the second pop up window includes a second time ordered listing of responses associated with the second content item;
presenting an aggregated pop up window that replaces the first pop up window and the second pop up window on the user interface associated with the subscriber based at least in part on a number of pop up windows satisfying a threshold value, wherein the aggregated window includes the first time ordered listing of response and the second time ordered listing of response; and
providing at least one selectable setting to dismiss the aggregated pop up window from view on the user interface, wherein in response to dismissal of the aggregated pop window the first content item assumes the first position in the news feed or assumes a second position in the news feed based on a re-ranking, wherein the re-ranking is based at least in part on at least one of: the selection of the first setting to subscribe, the posting of the first response, or an interaction with the first time ordered listing of responses.

17. The non-transitory computer-readable storage medium of claim 16, wherein the subscriber is at least one of: a user referenced in the first content item, a user referenced in the first response, or a user interested in dialogue associated with the first content item.

18. The non-transitory computer-readable storage medium of claim 16, further comprising:
receiving the first setting from the subscriber to subscribe to the first content item.

19. The non-transitory computer-readable storage medium of claim 16, further comprising:
maintaining a default setting to subscribe the subscriber to the first content item.

20. The non-transitory computer-readable storage medium of claim 16, wherein the presenting the first pop up window comprises presenting the first pop up window after the subscriber has navigated away from a location of a social networking system where the first content item is maintained.

* * * * *